United States Patent
Lee et al.

(10) Patent No.: US 10,089,958 B2
(45) Date of Patent: Oct. 2, 2018

(54) COLOR GENERATING METHOD, APPARATUS, AND SYSTEM

(71) Applicant: SAMSUNG ELECTRONICS CO., LTD., Suwon-si (KR)

(72) Inventors: Won-hee Lee, Cheongju-si (KR); Do-Hyeon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/602,743

(22) Filed: Jan. 22, 2015

(65) Prior Publication Data
US 2015/0206506 A1  Jul. 23, 2015

(30) Foreign Application Priority Data

Jan. 23, 2014  (KR) .................. 10-2014-0008513

(51) Int. Cl.
G09G 5/02 (2006.01)
G06F 3/0354 (2013.01)
G06F 3/041 (2006.01)
G06F 3/01 (2006.01)
G06F 3/0488 (2013.01)
G06T 7/90 (2017.01)

(52) U.S. Cl.
CPC ............. *G09G 5/026* (2013.01); *G06F 3/017* (2013.01); *G06F 3/03545* (2013.01); *G06F 3/0416* (2013.01); *G06F 3/0488* (2013.01); *G06T 7/90* (2017.01)

(58) Field of Classification Search
None
See application file for complete search history.

(56) References Cited

U.S. PATENT DOCUMENTS

| | | | | |
|---|---|---|---|---|
| 5,420,607 A | * | 5/1995 | Miller | G06F 3/03542 345/156 |
| 2003/0117408 A1 | * | 6/2003 | Forsline | G06F 3/03545 345/581 |
| 2005/0219255 A1 | * | 10/2005 | Lin | G09G 5/026 345/582 |
| 2006/0084039 A1 | * | 4/2006 | Ryokai | B44D 3/00 434/155 |
| 2007/0126734 A1 | * | 6/2007 | Sugio | G06T 15/04 345/419 |
| 2009/0027410 A1 | * | 1/2009 | Inuzuka | G09G 5/026 345/555 |
| 2009/0033811 A1 | * | 2/2009 | Schneider | G06F 3/0412 349/12 |

(Continued)

FOREIGN PATENT DOCUMENTS

KR   10-2008-0113832 A   12/2008

OTHER PUBLICATIONS

ATMEL, "AVR341: Four and Five-Wire Touch Screen Controller", ATMEL Application Note, Jul. 1, 2007, 19 pages total.

(Continued)

*Primary Examiner* — Hilina K Demeter
(74) *Attorney, Agent, or Firm* — Sughrue Mion, PLLC

(57) ABSTRACT

Disclosed is a method of generating a color by a color generating apparatus. The method includes acquiring color information corresponding to at least two different colors, sensing a motion, and mixing the at least two colors to generate a mixed color based on the sensed motion.

19 Claims, 14 Drawing Sheets

(56) References Cited

U.S. PATENT DOCUMENTS

| | | | |
|---|---|---|---|
| 2009/0238451 A1 | 9/2009 | Fuse et al. | |
| 2009/0319894 A1* | 12/2009 | Markiewicz | G06F 3/04883 715/702 |
| 2010/0097407 A1* | 4/2010 | Zulch | G01J 3/504 345/690 |
| 2011/0099476 A1* | 4/2011 | Snook | G06F 3/011 715/728 |
| 2012/0146943 A1* | 6/2012 | Fairley | G02F 1/167 345/174 |
| 2013/0120281 A1 | 5/2013 | Harris | |
| 2013/0120436 A1* | 5/2013 | Krishnaswamy | G06T 11/40 345/594 |
| 2013/0326381 A1* | 12/2013 | Pereira | G06F 3/04845 715/765 |
| 2014/0111539 A1* | 4/2014 | Allen | G06T 11/001 345/594 |
| 2014/0118399 A1* | 5/2014 | Todorovich | G06T 3/4038 345/634 |
| 2014/0273715 A1* | 9/2014 | Moll | G06F 3/03545 446/146 |

OTHER PUBLICATIONS

Communication dated May 12, 2015, issued by the European Patent Office in counterpart European Application No. 15150832.2.
Communication dated May 22, 2015, issued by the European Patent Office in counterpart European Application No. 1515832.2.
Communication dated Mar. 3, 2016 issued by European Patent Office in counterpart European Patent Application No. 15 150 832.2.
Park et al., "Mix Brush: An Interactive Digital Painting Tool with Shaking Interaction and Color Feedback", Jun. 23, 2010, 4 pages total, IEEE, New Jersey, USA, XP 031722294, ISBN: 978-1-4244-7384-7.

* cited by examiner

COLOR GENERATING METHOD, APPARATUS, AND SYSTEM

CROSS-REFERENCE TO RELATED APPLICATION

This application claims priority from Korean Patent Application No. 10-2014-0008513, filed on Jan. 23, 2014 in the Korean Intellectual Property Office, the disclosure of which is incorporated herein in its entirety by reference.

BACKGROUND

1. Field

Methods, apparatuses, and systems with exemplary embodiments relate to a color generating method, apparatus, and system, and more particularly, to a color generating method, apparatus, and system for generating a color by using a plurality of colors.

2. Description of the Related Art

Terminal apparatuses, including a display, such as smartphones, navigation terminals, information terminals, notebook computers, electronic notes, electronic dictionaries, educational supplies, toys for children, etc., may generally display a color. When a terminal apparatus includes a touch screen, a user may draw a picture or write letters in a desired color through a touch input.

A user may select a color, which is to be input through a touch, from among a plurality of displayed colors or input a color code, thereby selecting the color which is to be input. In this case, since the user selects a color by checking and selecting the color with his or her eyes or inputting the color code, it may be difficult and complicated for the user to accurately select a desired color.

SUMMARY

One or more exemplary embodiments provide a color generating method, apparatus, and system for generating a color that a user desires to use when an input is processed and an apparatus and a system adopting the same.

One or more exemplary embodiments provide a color generating method, apparatus, and system for generating a color having a texture based on a touch or gesture input, and an apparatus and a system adopting the same.

According to an aspect of an exemplary embodiment, there is provided a method of generating a color by a color generating apparatus, the method including acquiring color information corresponding to at least two different colors; sensing a motion; and mixing the at least two colors to generate a mixed color based on the sensed motion.

The acquiring may include sensing the at least two different colors by a color sensor and acquiring the color information based on the sensed at least two different color.

The acquiring may include sensing an input from a touch screen of a terminal apparatus; and receiving color information, indicating at least one color displayed in a region of the touch screen is sensed, according to the input being sensed.

The sensing may include sensing, by a motion sensor, a motion which shakes the color generating apparatus.

The sensing may include receiving information about a motion of the color generating apparatus from an external device; and sensing the motion of the color generating apparatus, based on the received information.

The mixing may include determining a mixing condition of the at least two different colors; and mixing the at least two different colors based on the mixing condition to generate the mixed color.

The determining of the mixing condition may include acquiring at least one selected of a time and a region in which each of the at least two different colors is sensed, and the mixing of the at least two different color may comprise determining the mixing condition, based on the at least one of the acquired time and the acquired region.

The method may further include acquiring at least at least two different textures; combining the acquired at least two different textures to generate a mixed texture; sensing a motion; and combining the mixed texture with the mixed color to generate a color having the mixed texture based on the sensed motion.

According to an aspect of another exemplary embodiment, there is provided a color generating system including a touch tool configured to acquire color information corresponding to at least two different colors, sense a motion for mixing the at least two different colors, and mix the at least two different colors to generate a mixed color based on the sensed motion; and a first terminal configured to display the mixed color received from the touch tool.

The touch tool may sense a touch input from a touch screen of the first terminal, receive color information about a region in which the input is sensed, and acquire at least one color, based on the received color information.

The color information may include information about a time or a region in which the touch input is sensed.

The touch tool may acquire a texture, sense a motion for combining the texture with the mixed color, and combine the texture with the mixed color to generate a color having a texture based on the sensed motion.

The color generating system may further include a second terminal configured to display the at least two different colors and the mixed color based on the motion.

The touch tool may receive information about a motion of the touch tool from the first terminal, and sense the motion of the touch tool, based on the received information, and when the motion of the touch tool is sensed, the first terminal may transmit the information about the motion of the touch tool to the touch tool.

According to an aspect of another exemplary embodiment, there is provided a non-transitory computer-readable storage medium storing a program that is executable by a computer to perform a color generating method. The color generating method may include acquiring color information corresponding to at least two different colors; sensing a motion; and mixing the at least two colors to generate a mixed color based on the sensed motion.

According to an aspect of another exemplary embodiment, there is provided an color generating apparatus including a display configured to display a plurality of colors; a sensor configured to sense a touch or a gesture with respect to the color generating apparatus; and a controller configured to select at least two colors of the plurality of colors and determine a mixing condition for the selected at least two colors based on the sensed touch or the sensed gesture, and generate a color based on the mixing condition.

The plurality of colors may be displayed in a region divided into sub-regions by a number of the plurality of colors, and the plurality of colors may be arranged in a manner allowing the touch or the gesture to be input by a single continuous touch or a single continuous gesture.

The displayed plurality of colors may be acquired from an image sensor that captures a color of an external object or an external environment.

The controller may determine the mixing condition based on a time duration and a size of a region in which the touch or the gesture is sensed.

The display may display a texture, the sensor may sense a touch or a gesture for mixing the texture and at least one color selected from the displayed plurality of colors, and the controller may determine a mixing condition based on the sensed touch or gesture.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
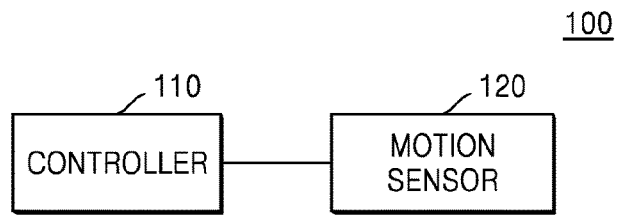
FIGS. 1 and 2 are block diagrams illustrating a color generating apparatus according to an exemplary embodiment.

Exemplary embodiments are described in greater detail below with reference to the accompanying drawings, wherein like reference numerals refer to like elements throughout. In this regard, the present embodiments may have different forms and should not be construed as being limited to the descriptions set forth herein.

The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In this disclosure below, when it is described that one comprises (or includes or In this disclosure below, when it is described that one comprises (or includes or has) some elements, it should be understood that it may comprise (or include or has) only those elements, or it may comprise (or include or have) other elements as well as those elements if there is no specific limitation. Moreover, each of terms such as " . . . unit", " . . . apparatus" and "module" described in specification denotes an element for performing at least one function or operation, and may be implemented in hardware, software or a combination of hardware and software.

An object denotes a target capable of being selected by a user. Examples of the object include an icon, a link, a picture, a text, and an index item. A page denotes a space including content, information, or an object. For example, examples of the page include a webpage, a content list, a thumbnail list, a tray in which photographs are arranged, and a tray in which icons are arranged.

A gesture denotes a hand motion which is made by a user for controlling an apparatus. The gesture may be input to the apparatus by using a touch tool (a stylus) instead of a hand motion. In addition, the gesture may include a motion in which the user manipulates the apparatus so as to control the apparatus.

Exemplary embodiments of the present invention capable of being easily embodied by those of ordinary skill in the art will now be described in detail with reference to the accompanying drawings. The present invention may, however, be embodied in many different forms and should not be construed as being limited to the embodiments set forth herein. In the accompanying drawings, a portion irrelevant to a description of the present invention will be omitted for clarity.

Hereinafter, exemplary embodiments of the present invention will be described with reference to the accompanying drawings.

Figure 2:
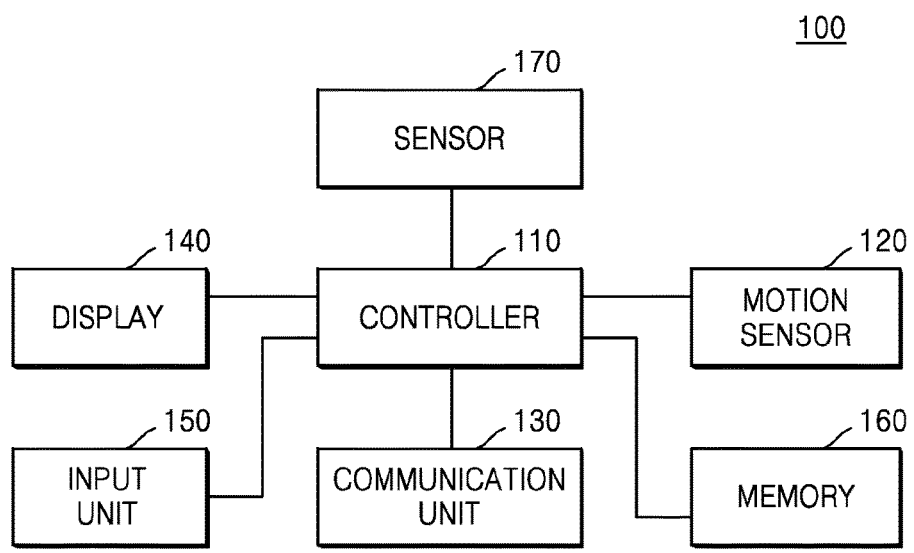

FIGS. 1 and 2 illustrate a color generating apparatus 100 according to an exemplary embodiment.

The color generating apparatus 100 may be various types of apparatuses that perform an operation of processing a color by using color information. For example, the color generating apparatus 100 may be a touch tool, which is used to input a touch input to a touch screen of a terminal apparatus by using color information, such as a stylus pen. The color generating apparatus 100 may be a terminal apparatus (for example, one selected from a portable phone, a smartphone, a personal digital assistants (PDA), and a tablet personal computer (PC)) that performs an operation by using color information generated by sensing a motion. This is merely an example, and may be construed as a concept that includes an apparatus which has been developed and commercialized at present, or will be developed in the future, in addition to the above-described example.

The color generating apparatus 100 according to an exemplary embodiment may acquire at least two different original colors, and generate a new color by using the original colors. For example, the color generating apparatus 100 may determine color codes for at least two different original colors which are to be mixed with each other, and determine a color code of a mixed color according to a predetermined algorithm by using the color codes of the original colors. In this case, the color generating apparatus 100 may sense a motion for mixing different original colors and generate a new color by using the original colors. Therefore, the color generating apparatus 100 may intuitively generate a mixed color by sensing a motion of a user for selecting various colors as if the user actually mixes the various colors in the real world.

The color generating apparatus 100 according to an exemplary embodiment may mix at least two colors for generating a new color according to a predetermined algorithm, and determine a color code for a mixed color. The color generating apparatus 100 may generate color information including the color code to generate a color. Generating a color is not limited to the above-described example, and a color may be generated by various methods.

Furthermore, the color generating apparatus 100 may sense a motion for acquiring at least one color and texture and generate a new color having a texture based on the acquired color and texture. For example, the color generating apparatus 100 may determine a code for identifying at least one color and texture, and generate data including color information having a texture according to a predetermined algorithm by using the determined code. In this case, a color having a texture (also referred to as a color having a texture value or a color combined with a texture) may denote a color which is displayed by a display along with a texture thereof. The color generating apparatus 100 senses a motion, and thus easily generates a color having a texture by using at least one color and texture.

The color generating apparatus 100 according to an exemplary embodiment may generate a unit image, including a color having a texture, or color information for identifying the color and the texture to generate the color having the texture. Therefore, an external device or the color generating apparatus 100 may display the color having the texture, based on the above-described color information or the unit image. Generating the color having the texture is not limited to the above-described example, and the color having the texture may be generated by various methods.

A texture generally denotes a texture sensation of a material, but in an exemplary embodiment, a texture that can be combined with a color may include a pattern as well as a texture sensation of a material. Thus, texture information of an image of an object may allow a user to perceive physical properties of the object, such as color and texture. For example, a texture that can be combined with a color may include a texture sensation, such as wood grain, paper, or plastic, and a pattern such a stripe, a check, or a diagonal pattern.

As shown in FIG. 1, the color generating apparatus 100 according to an exemplary embodiment may include a controller 110 and a motion sensor 120. However, the elements illustrated in FIG. 1 are not all essential elements. The color generating apparatus 100 may be implemented with a higher number of elements than the number of the illustrated elements, or may be implemented with a lower number of elements than the number of the illustrated elements.

The controller 110 may generally control an overall operation of the color generating apparatus 100. For example, the controller 110 may acquire at least two different colors according to a motion sensed by the motion sensor 120 and generate a new color using the acquired original colors. Also, the controller 110 may acquire at least one color and texture and generate a color having a texture according to a motion sensed by the motion sensor 120. That is, the controller 110 may control the motion sensor 120 to recognize a color and a texture that is input through the motion sensor 120. In this case, the generated new color may be transmitted to an external device, or may be used to perform a touch input operation using a touch tool.

The motion sensor 120 may include an element for sensing a motion of mixing colors or combining a color with a texture to generate a new color.

The motion sensor 120 according to an exemplary embodiment may sense a motion, based on information received from an external device or information sensed by at least one sensor. To provide a detailed description, the motion sensor 120 may include a communication module that receives information of a motion of the color generating apparatus 100 sensed by at least one external device, and sense the motion of the color generating apparatus 100, based on the received information. In addition, the motion sensor 120 may include at least one or more sensors that sense the motion of the color generating apparatus 100, and sense the motion, based on information sensed by the at least one sensor. The motion sensor 120 may include the communication module and at least one of the sensors.

For example, a sensor of an external device may sense a motion of the color generating apparatus 100 and transmit information of the sensing to the color generating apparatus 100. In turn, the motion sensor 120 of the color generating apparatus 100 may sense the motion based on the information transmitted from the sensor of the external device. When a gesture is input through a touch screen of the external device, the external device may transmit information of the input gesture to the color generating apparatus 100. For example, the color generating apparatus 100 may input, to the touch screen of the external device, a gesture of mixing different colors or mixing at least one color and texture.

Examples of the communication module, which is included in the motion sensor 120 and receives information for sensing a motion from the external device, may include a mobile communication module, a wireless Internet module, a wired Internet module, and a short-distance communication module.

The mobile communication module transmits or receives a wireless signal to or from at least one selected from a base station, an external terminal, and a server over a mobile communication network. Here, the wireless signal may include various types of data based on transmission or reception of a voice call signal, a video call signal, or a letter/multimedia message.

The wireless Internet module denotes a module for wireless Internet access, and may be built into or provided outside the color generating apparatus 100. Also, a wired Internet module denotes a module for wired Internet access.

The short-distance communication module denotes a module for short-distance communication. Short-distance communication technology may use Bluetooth, radio frequency identification (RFID), infrared data association (IrDA), ultra wideband (UWB), ZigBee, Wi-Fi direct (WFD), near field communication (NFC), and universal serial bus (USB).

As another example, the motion sensor 120 may sense a motion of the color generating apparatus 100 by using a motion sensor included in the motion sensor 120. The motion sensor may be a sensor that senses a motion. The sensor of the motion sensor 120 may sense a motion in which the color generating apparatus 100 is shaken upward and downward by a user or is shuttlewise moved back and forth on a plane, and thus, the motion sensor 120 may sense the motion.

In this case, the motion sensor 120 may include an inertial sensor as the motion sensor for sensing the motion of the color generating apparatus 100. An example of the inertial sensor may include at least one selected from an acceleration sensor, a gyro sensor, and a geomagnetic sensor.

The acceleration sensor may measure an acceleration generated by the motion of the color generating apparatus 100 to sense the motion. Also, the gyro sensor may measure an angular velocity from the motion of the color generating apparatus 100 to sense the motion. Also, the geomagnetic sensor may detect a terrestrial magnetism to measure a direction angle of the color generating apparatus 100, thereby sensing the motion of the color generating apparatus 100.

The color generating apparatus 100 may include a sensor or an element for sensing a position of the color generating apparatus 100 to measure a position or a distance which is used to sense the motion of the color generating apparatus 100.

In an exemplary embodiment, a sensor for sensing a position of the color generating apparatus 100 may sense the position of the color generating apparatus 100 when the motion is sensed by the inertial sensor. In this case, the color generating apparatus 100 may determine the motion of the color generating apparatus 100, based on the sensed position.

For example, when a motion of the color generating apparatus 100 is sensed, the color generating apparatus 100 may mix colors to generate a new color, or initialize an acquired color, based on a position where the motion is sensed. To provide a detailed description, based on the position where the motion is sensed, the color generating apparatus 100 may initialize an acquired color or texture so as to generate a new color, and may again acquire a color or a texture.

Moreover, the color generating apparatus 100 may sense the motion of the color generating apparatus 100 according to a change in a position of the color generating apparatus 100.

A motion, which is sensed for mixing colors or generating a color having a texture, may include a motion which involves shaking of the color generating apparatus 100 as if paints of different colors are actually being mixed with each other. Also, the motion may include a motion in which the color generating apparatus 100 is turned round and round or is shuttlewise moved on a plane as if paints are actually mixed on a palette with a brush. When the motion is sensed, the color generating apparatus 100 may mix at least two colors to generate a new color. Therefore, an intuitive motion of the color generating apparatus 100 may be performed, such as a motion equivalent to paints of different colors being mixed with a brush or a water pail, to generate a new color, which is generated by mixing at least two colors, or a color having a texture.

As shown in FIG. 2, a color generating apparatus 100 according to an embodiment may include a controller 110, a motion sensor 120, a communication unit 130, a display 140, an input unit 150, a memory 160, and a sensor 170. The controller 110 and motion sensor 120 of FIG. 2 respectively correspond to the controller 110 and motion sensor 120 of FIG. 1, and a repeated description thereof will be omitted here. However, the elements illustrated in FIG. 2 are not all essential elements. The color generating apparatus 100 may be implemented with a higher number of elements than the number of the illustrated elements, or may be implemented with a lower number of elements than the number of the illustrated elements.

The below-described sensor 170 may sense at least two different colors being selected or input, and the controller 110 may acquire the sensed colors. Alternatively, the controller 110 may acquire color information received from an external device. In addition, the controller 110 may read color information stored in the below-described memory 160 to acquire the color information. Here, the color information may include color code information corresponding to each color. The controller 110 according to an exemplary embodiment may acquire two different colors by using at least one of the above-described three methods of acquiring a color.

Moreover, the sensor 170 may sense at least one texture, and the controller 110 may acquire the sensed texture. Alternatively, the controller 110 may acquire texture information received from the external device. Here, the texture information may include image information or code information for identifying a texture. Also, the controller 110 may use texture information stored in the memory 160 to acquire the texture information. The controller 110 according to an exemplary embodiment may acquire at least one texture by using at least one of the above-described three methods of acquiring a texture.

For example, in a picking mode of picking a color or a texture displayed by a display of the external device, when a touch input is received, the controller 110 may receive color or texture information from the external device to acquire color or texture information. To provide a detailed description, when information input through a touch is transmitted to the external device or a touch input is sensed by the external device, the controller 110 may receive color or texture information to acquire a color or a texture. In addition, even when the external device does not include a sensor, the color generating apparatus 100 may include a sensor that senses a touch input.

When the color generating apparatus 100 generates a color having a texture, the color generating apparatus 100 may acquire at least one color unlike the above description. In this case, the color generating apparatus 100 may generate the color having the texture by using at least one color and texture.

The motion sensor 120 may sense a motion equivalent to mixing colors or combining a color with a texture to generate a new color, based on information sensed or acquired by the sensor 170 or communication unit 130.

The communication unit 130 may include one or more elements configured to enable and perform communication between the color generating apparatus 100 and at least one external device. For example, the communication unit 130 may include a mobile communication module, a wireless Internet module, a wired Internet module, and a short-distance communication module. The communication unit 130 may transmit or receive data to or from the at least one external device by using at least one selected from the mobile communication module, the wireless Internet module, the wired Internet module, and the short-distance communication module.

The communication unit 130 according to an exemplary embodiment may receive information of at least one color from the at least one external device. Also, when a motion of the color generating apparatus is performed for mixing colors by using a touch screen of the external device, the communication unit 130 may receive, from the external device, pieces of information on mixing the colors. In this case, a motion of the color generating apparatus 100 may be performed that mixes at least two or more colors displayed on the touch screen. For example, the communication unit 130 may receive information about a region, in which a touch input is received by the color generating apparatus 100, or information about a motion of mixing at least one or more colors included in color information included in the region where the touch input is received.

Moreover, when the color generating apparatus 100 generates a color having a texture, the communication unit 130 may receive information of at least one texture from the at least one external device. Also, when a motion of the color generating apparatus 100 is performed for generating a color having a texture by using the touch screen of the external device, the communication unit 130 may receive, from the external device, pieces of information, on generating the color having the texture. At this time, a motion of the color generating apparatus 100 may be performed for combining the color and the texture which are displayed on the touch screen. For example, the communication unit 130 may receive information about a region, in which a touch input is received by the color generating apparatus 100, or information about a motion of generating a color having a texture and including at least one of color and texture information included in the region where the touch input is received.

Moreover, the communication unit 130 may transmit color information generated by the color generating apparatus 100 to the external device, and a touch input motion or another motion of the color generating apparatus 100 may be performed by using a generated color.

The input unit 150 may generate input data for controlling an operation of the color generating apparatus 100. The input unit 150 may include a key pad, a dome switch, a touch pad (static pressure/power outage), a jog wheel, a jog switch, and a hardware (H/W) button. In particular, when the touch pad forms a mutual layer structure with the display 140 that is described in more detail below, the touch pad may be referred to as a touch screen.

The display 140 may display information obtained through processing by the color generating apparatus 100. For example, the display 140 may display a color-related user interface (UI) or graphic user interface (GUI) for generating a color or a texture, which is used to mix colors or generate a color having a texture.

As described above, when the display 140 and the touch pad forms the mutual layer structure to configure the touch screen, the display 140 may be used as an input device in addition to an output device. The display 140 may include at least one selected from a liquid crystal display, a thin film transistor-liquid crystal display (TFT-LCD), an organic light-emitting diode (OLED), a flexible display, and a three-dimensional (3D) display. The display 140 may be provided as two or more depending on an implementation type of the color generating apparatus 100. The touch screen may detect a position of a touch input, a touched area, and a touch input pressure. Also, the touch screen may detect a proximity touch as well as a real touch.

In the present specification, the real touch denotes a case in which a pointer directly touches a screen, and the proximity touch denotes a case in which a touch tool does not actually touch a screen but approaches within a range of a certain distance from the screen. The touch tool denotes a tool for touching a portion of a displayed screen or executing the proximity touch. Examples of the touch tool may include a stylus pen and a finger. In an exemplary embodiment, the color generating apparatus 100 may act as a touch tool for a terminal apparatus including a touch screen.

The memory 160 may store a program to control an operation of the controller 110, and store pieces of input/output data (for example, a generated color, an acquired color, a texture, information received from the external device, etc.) that the controller 110 may access and retrieve.

The memory 160 may include at least one type of storage medium selected from a flash memory type of memory, a hard disk type of memory, a multimedia card micro type of memory, a card type of memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the color generating apparatus 100 may operate web storage that performs a storage function of the memory 160 on the Internet.

The sensor 170 may sense a color or a texture of an external object or environment to generate a sensing signal for acquiring the color or the texture. The sensor 170 according to an exemplary embodiment may include a color sensor. In addition, the sensor 170 may further include an image sensor that senses and acquires a texture of an external object or environment when the color generating apparatus 100 generates a color having a texture. Therefore, the color generating apparatus 100 according to an exemplary embodiment may acquire at least one color or texture by using a color or a texture sensed by the sensor 170.

The color sensor may include an RGB sensor that senses a color of an external object or environment. The image sensor is a sensor for sensing a texture of the external object or environment, and instead of the image sensor, a camera may be used for photographing the external object or environment.

Moreover, the sensor 170 may include an inertial sensor as a motion sensor for sensing a motion of the color generating apparatus 100. An example of the inertial sensor may include at least one selected from an acceleration sensor, a gyro sensor, and a geomagnetic sensor.

The acceleration sensor may measure an acceleration generated by the motion of the color generating apparatus 100 to sense the motion. Also, the gyro sensor may measure an angular velocity from the motion of the color generating apparatus 100 to sense the motion. Also, the geomagnetic sensor may detect a terrestrial magnetism to measure a direction angle of the color generating apparatus 100, thereby sensing the motion of the color generating apparatus 100.

The color generating apparatus 100 may include a sensor for sensing a position of the color generating apparatus 100 to measure a position or a distance which is used to sense the motion of the color generating apparatus 100.

Figure 3:
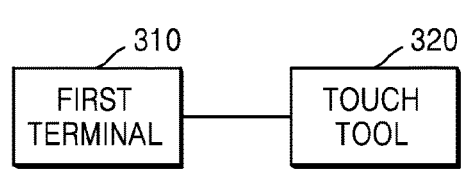
FIGS. 3 and 4 are block diagrams illustrating a color generating system according to an exemplary embodiment.
Figure 4:
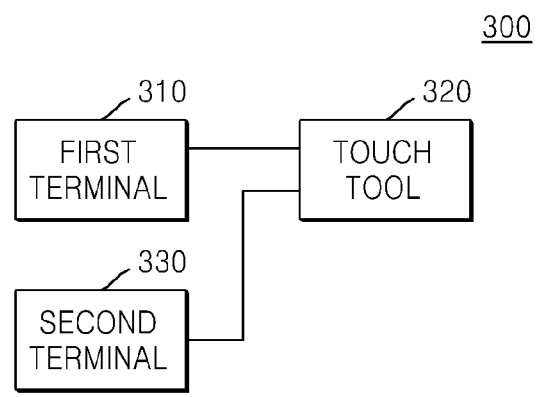

FIGS. 3 and 4 are block diagrams illustrating a color generating system 300 according to an exemplary embodiment.

As shown in FIG. 3, a color generating system 300 according to an exemplary embodiment may include a first terminal 310 and a touch tool 320. The touch tool 320 of FIG. 3 corresponds to the color generating apparatus 100 of FIGS. 1 and 2, and thus, a repeated description thereof will be omitted here. However, the elements illustrated in FIG. 3 are not all essential elements. The color generating system 300 may be implemented with a higher number of elements than the number of the illustrated elements, or may be implemented with a lower number of elements than the number of the illustrated elements.

The first terminal 310 may include various types of apparatuses that include a display for displaying a color generated by the touch tool 320. For example, the first terminal 310 may be a personal computer (PC), a notebook computer, a mobile phone, a tablet PC, a navigation terminal, a smartphone, a smart watch, a personal digital assistants (PDA), a portable multimedia player (PMP), or a digital broadcasting receiver. This is merely an example, and may be construed as a concept that includes all communication-enabled apparatuses which have been developed and commercialized at present, or will be developed in the future, in addition to the above-described example.

The first terminal 310 according to an exemplary embodiment may receive color information from the touch tool 320 and display a color based on the received color information, according to a touch input of the touch tool 320. In this manner, the touch tool 320 performs the touch input.

The touch tool 320 may mix at least two colors or generate a color having a texture, and transmit information of the generated color to the first terminal 310. For example, the touch tool 320 may input a line, a figure, or a letter which has a corresponding color, or perform a touch input so as to display an object with a corresponding color applied thereto. For example, a background screen, a UI, or a GUI to which a corresponding color is applied may be displayed.

As shown in FIG. 4, a color generating system 300 according to an exemplary embodiment may include a first terminal 310, a second terminal 320, and a touch tool 320. The touch tool 320 of FIG. 4 may correspond to the color generating apparatus 100 of FIGS. 1 and 2 and the touch tool 320 of FIG. 3, and thus, a repeated description thereof will be omitted here. However, the elements illustrated in FIG. 4 are not all essential elements. The color generating system 300 may be implemented with a higher number of elements than the number of the illustrated elements, or may be implemented with a lower number of elements than the number of the illustrated elements.

The second terminal 310 may include various types of apparatuses that include a display for displaying a color generated by the touch tool 320. For example, the first terminal 310 may be a PC, a notebook computer, a mobile phone, a tablet PC, a navigation terminal, a smartphone, a smart watch, a PDA, a PMP, or a digital broadcasting receiver. This is merely an example, and may be construed as a concept that includes all communication-enabled apparatuses which have been developed and commercialized at present, or will be developed in the future, in addition to the above-described example.

The second terminal 330 according to an exemplary embodiment may acquire color or texture information, used to generate a new color, from a sensor or an element which is included in the touch tool 320, an external device, or the second terminal 330, and display the acquired color or texture information. The second terminal 330 may mix the displayed colors or generate a color having a texture according to a motion of the touch tool 320. For example, a color code corresponding to a mixed color based on color or texture information or corresponding to a color having a texture may be determined, or image information corresponding to the color having the texture may be generated. In this case, a motion capable of being input may include a motion equivalent to paints being mixed on a palette in a region where a color or a texture is displayed. The second terminal 330 may transmit information about a region, to which a motion of the touch tool 320 is input, to the touch tool 320, and the touch tool 320 may mix colors or generate a color having a texture by using the transmitted information. In other words, the touch tool 320 may determine a color mixing condition or a texture combining condition, based on the information about the region to which the gesture of the touch tool 320 is input. And the touch tool 320 may mix colors according to the color mixing condition or generate a color having a texture according to the texture combining condition.

Figure 5:
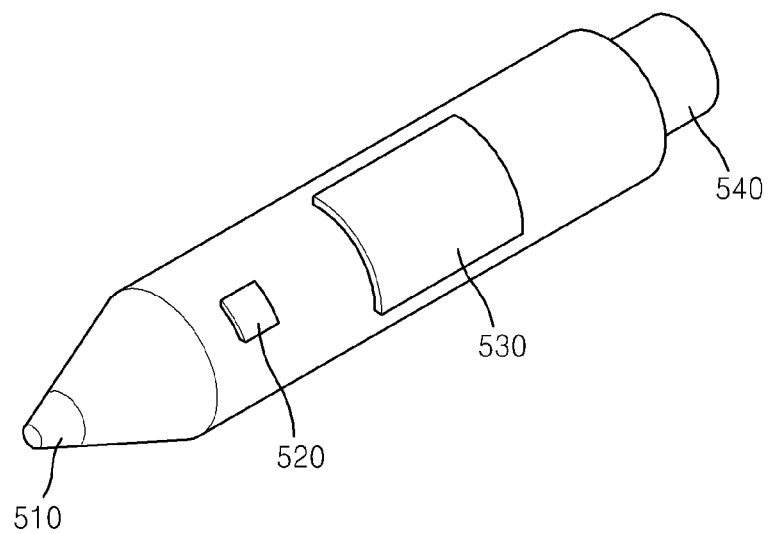
FIG. 5 illustrates an example of a color generating apparatus according to an exemplary embodiment.

FIG. 5 illustrates an example of a color generating apparatus 500 according to an exemplary embodiment.

As shown in FIG. 5, the color generating apparatus 500 may include a plurality of sensors 510 and 540, a button 520, and a display 530. The color generating apparatus 500 of FIG. 5 may correspond to the color generating apparatus 100 of FIGS. 1 and 2 and the touch tool 320 of FIGS. 3 and 4, the sensors 510 and 540 of FIG. 5 may correspond to the sensor 170 of FIG. 2, and the display 530 of FIG. 5 may correspond to the display 140 of FIG. 2. The same description will not be repeated. However, the elements illustrated in FIG. 5 are not all essential elements. The color generating apparatus 500 may be implemented with a higher number of elements than the number of the illustrated elements, or may be implemented with a lower number of elements than the number of the illustrated elements. The color generating apparatus 500 according to an embodiment may have a shape such as that of a brush or a pen.

The color generating apparatus 500 may sense a color or a texture of an external object or environment or sense a touch input received through a display of an external device to acquire a color or a texture, by using the sensors 510 and 540. When the touch input is sensed, the color generating apparatus 500 may receive color or texture information from the external device to acquire a color or a texture. A new color may be generated based on the acquired color. A sensor may be provided at a front portion of the color generating apparatus 500 like the sensor 510 illustrated in FIG. 5. Also, a sensor may be provided at a rear portion of the color generating apparatus 500 like the sensor 540 illustrated in FIG. 5.

The color generating apparatus 500 may acquire a color or a texture or generate a color according to a user input received through the button 520. For example, the color generating apparatus 500 may switch to a picking mode, in which a color or a texture is picked, to acquire the color or the texture according to user input received through the button 520. In an exemplary embodiment, picking may denote that a color or texture of an external environment is sensed by the sensors 510 and 540, or a color or a texture displayed by the external device is acquired by receiving color or texture information from the external device according to a touch input. Therefore, the picking mode of the color generating apparatus 500 may be switched according to a user input received through the button 520. Accordingly, a picking time of a sensed color or texture may be determined based on information received from the sensors 510 and 540 or the external device according to a user input in the picking mode, and a mixing condition or a combining condition for generating a color may be determined based on the picking time. In other words, the picking time may be determined according to the user input when the same color or texture is sensed by the sensors 510 and 540 or a touch sensor or proximity sensor of the external device, or may be determined by switching the picking mode according to an input received through the button 520. Although the mixing condition is described as being determined based on a picking time, embodiments are not limited thereto. For example, the mixing condition may be determined based on pressures applied to each of displayed colors to be mixed. For example, if the sensor 510 senses that a pressure applied to a red color region is twice than a pressure applied to a blue color region, the mixing condition of the red color and the blue color may be determined as 2:1. In addition, the mixing condition may be determined based on both a picking time and a pressure.

The display 530 may display a picked color or texture, or display a newly generated color. Also, the display 530 may further display a mixing condition or a combining condition, which is determined when generating a color. For example, the display 30 may differently display a width of a region, in which each color is displayed, in proportion to a mixing ratio determined based on the mixing condition. Also, the display 530 may display a feature of a texture such as a thickness or strength of the texture determined based on the combining condition.

Figure 6:
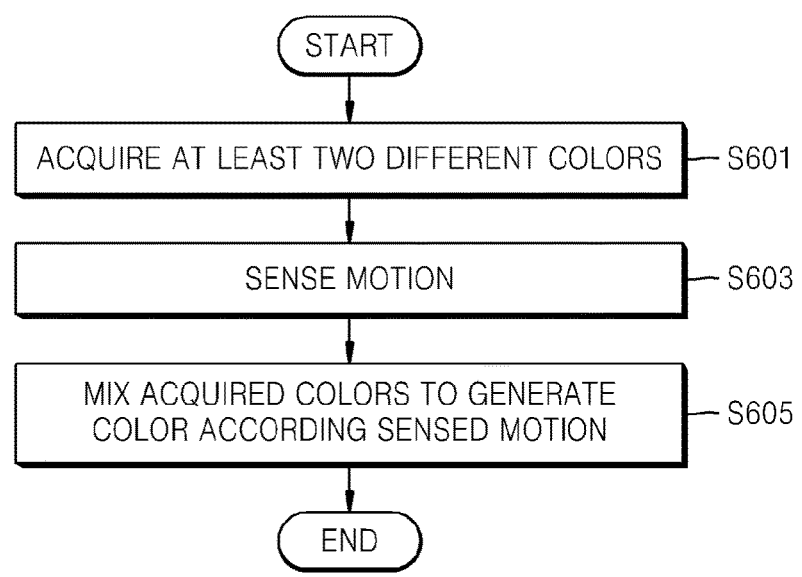
FIG. 6 is a flowchart illustrating a color generating method according to an exemplary embodiment.

FIG. 6 is a flowchart illustrating a color generating method according to an exemplary embodiment.

As shown in FIG. 6, a color generating apparatus 100 may acquire at least two different colors (S601). In this case, the color generating apparatus 100 may acquire the colors by performing the above-described color acquiring method.

When the color generating apparatus 100 acquires a color from the sensor 170 sensing the color from an external object or environment or acquires the color from a color displayed by an external device and selected through a touch input, the color generating apparatus 100 may further acquire a picking time for each color. Therefore, the color generating apparatus 100 may use the acquired picking time in determining a mixing condition for generating a color.

The color generating apparatus 100 may sense a motion for mixing colors (S603). In this case, the color generating apparatus 100 may display information indicating that the motion for mixing the colors is sensed. For example, the color generating apparatus 100 may display the colors which are acquired in operation S601, and display a form in which colors are randomly mixed according to a motion as if colors displayed by a display are mixed according to a sensed motion. For example, by using information sensed by an inertial sensor, a color may be displayed as if paints of different colors are randomly mixed in water according to a motion of the color generating apparatus 100.

The color generating apparatus 100 may mix the acquired colors to generate a new color according to the sensed motion (S605). In this case, the color generating apparatus 100 may generate the new color according to the combination condition determined based on the picking time of each color which is acquired in operation S601. For example, the color generating apparatus 100 may determine a mixing ratio, based on the picking time of each color, and generate the new color according to the determined mixing ratio.

Figure 7:
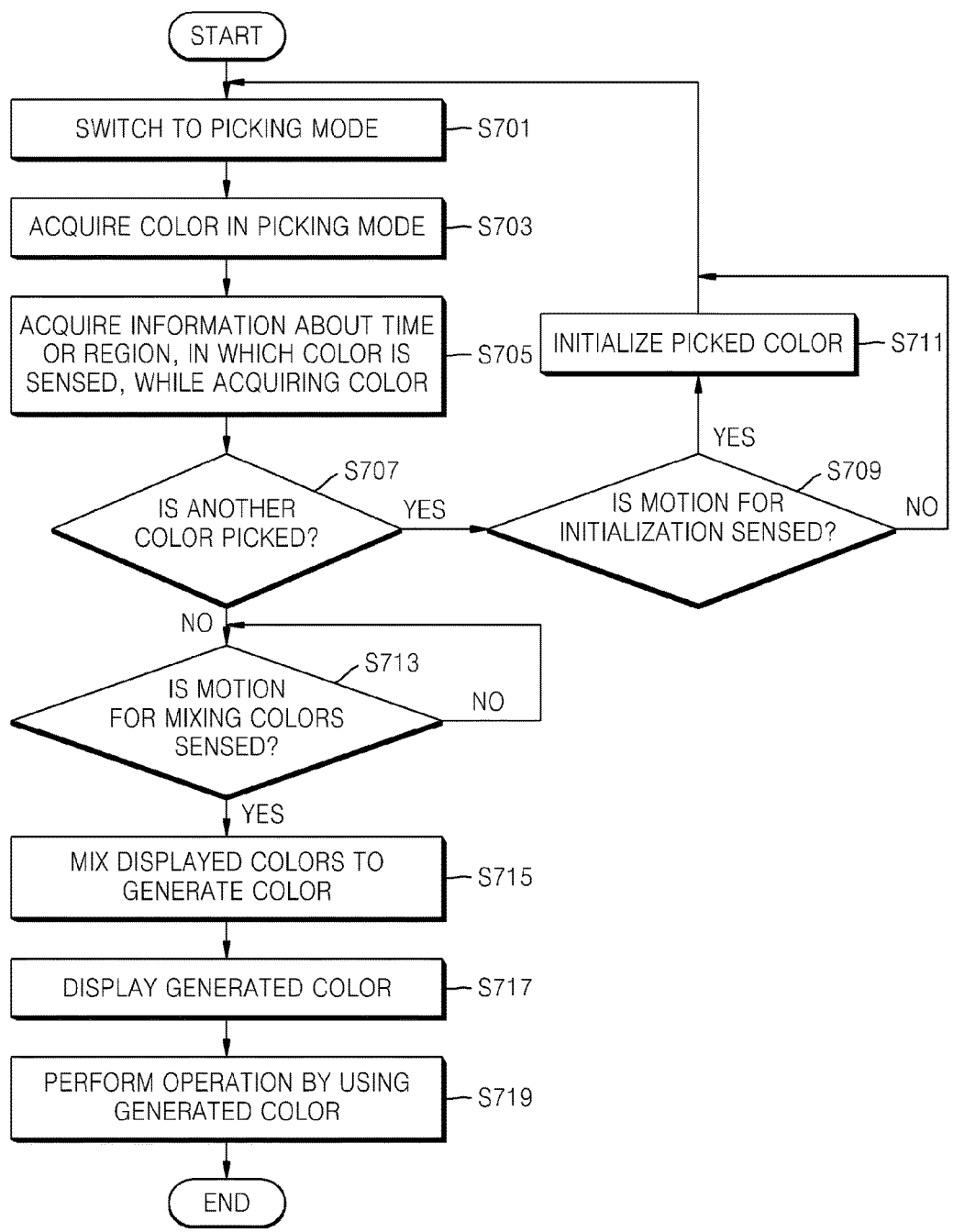
FIG. 7 is a flowchart illustrating a method of generating a color by using a sensor, according to an embodiment.

FIG. 7 is a flowchart illustrating a method of generating a color by using a sensor, according to an exemplary embodiment.

As shown in FIG. 7, a color generating apparatus 100 may switch to a picking mode, for example, according to a user input (S701).

In the picking mode, the color generating apparatus 100 may acquire a color of an external object or environment by using a sensor, or receive color information from an external device to acquire a color displayed by the external device (S703).

While the color is being acquired, the color generating apparatus 100 may further acquire information about a time or a region in which the color is sensed (S705). The information about the region in which the color is sensed may include information about a range of a region in which the same color is sensed. For example, the color generating apparatus 100 may acquire color information and region information by performing an input for picking as if the color generating apparatus 100 draws a closed figure to perform a touch input for a region in which the same color is displayed in the external device. Also, the information about the time in which the color is sensed may include information about a time in which a touch input for each color is continued while in the picking mode. The information which is acquired in operation S705 may be used to determine a combining condition for mixing colors. For example, a mixing ratio when a corresponding color is mixed may be determined in proportion to a range of a color-sensed region or time information. Also, the color generating apparatus 100 may display, in a display, information indicating that a mixing ratio of a picked color increases according to a touch input being continued, based on the information about the time in which the color is sensed.

The color generating apparatus 100 may determine whether to pick different colors (S707).

When the color generating apparatus 100 receives an input for picking another color, the color generating apparatus 100 may sense a user input or a motion for initializing picked color (S709). For example, a motion may be sensed in which the color generating apparatus 100 is shuttlewise moved in a fan shape as if a brush is sunk in water and shaken backward and forward. Therefore, the color generating apparatus 100 may change a motion depending on a kind of the sensed motion.

When the user input or the motion for initialization is sensed, the color generating apparatus 100 may initialize the picked color (S711). That is, the color generating apparatus 100 may initialize the picked color for mixing colors, and pick another color as in operations S701 to S705. In addition, a touch input which slides or drags the picked color displayed on a display screen 140 of the color generating apparatus 100 may be input, and thus, the picked color may be deleted.

When the picked color is not initialized, the color generating apparatus 100 may further pick another color as in operations S701 to S705, for mixing colors.

The color generating apparatus 100 may sense a motion for sensing at least two or more picked colors (S713). The color generating apparatus 100 may sense a motion, based on information received from the external device or information sensed by an inertial sensor of the color generating apparatus 100.

The color generating apparatus 100 may mix colors, picked for mixing, to generate a new color (S715). In this case, the colors may be mixed with each other according to the above-described mixing condition. For example, the color generating apparatus 100 may determine a mixing ratio of each color, based on the time information or the region information acquired in operation S705, and mix colors according to the determined mixing ratio.

Moreover, the color generating apparatus 100 may mix the acquired colors to generate a new color according to a touch input sensed through a touch screen of the display screen 140 of the color generating apparatus 100, in addition to the sensed motion. For example, when a touch input such as a drag motion is sensed in order for two or more colors to be mixed in the display screen 140 displaying the picked color, the color generating apparatus 100 may mix the acquired colors to generate the new color.

In this case, colors may be mixed with each other according to the above-described mixing condition, or may be mixed with each other based on color information which is on a path along which a touch input is received. For example, colors which are on a path along which a touch input is received may be mixed with each other. Also, a mixing condition may be determined based on a time in which a touch input is received for each color or a width of a region in which the touch input is received, and colors may be mixed with each other according to the determined mixing condition.

The color generating apparatus 100 may display the new color (S717). In this case, the color generating apparatus 100 may display the new color in the display of the color generating apparatus 100 or a display of the external device.

The color generating apparatus 100 may perform an operation by using the new color (S719). For example, the color generating apparatus 100 may transmit information of the new color to the external device, or a touch input may be performed by using the generated color, thereby generating a line or a figure having the generated color or setting a background color.

Figure 8:
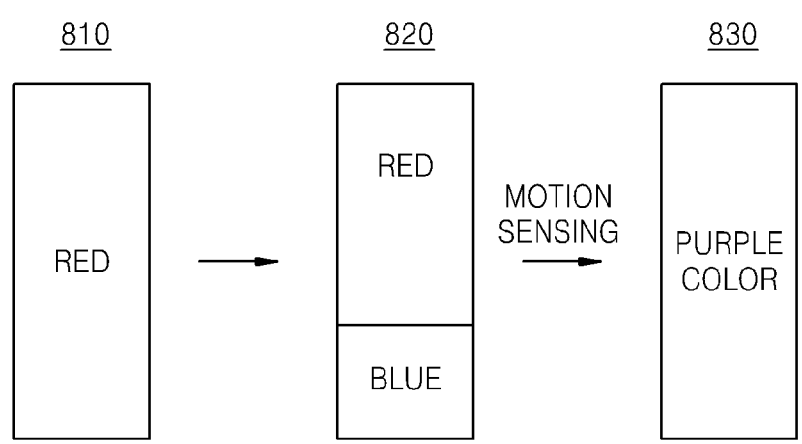
FIG. 8 illustrates an example of displaying a color in a color generating apparatus according to an exemplary embodiment.

FIG. 8 illustrates an example of displaying a color in a color generating apparatus according to an exemplary embodiment.

As shown in FIG. 8, a color generating apparatus 100 may display colors in a display in each operation of picking a color to mix colors. In this case, a color displayed in the display may be a color which is picked by being sensed by a sensor, receiving color information from an external device, or reading color information stored in the memory 160 of the color generating apparatus 100.

A display screen 810 may represent a state in which red is picked.

A display screen 820 may represent a state in which red is picked and then blue is picked. In this case, the color generating apparatus 100 may determine a mixing ratio of red and blue, based on a picking time or a width of a picking region, and a ratio at which each color is displayed may differ on the display screen 820 according to the determined mixing ratio.

When a motion for mixing colors is sensed, a display screen 830 may display a purple color that is a mixed color.

Figure 9:
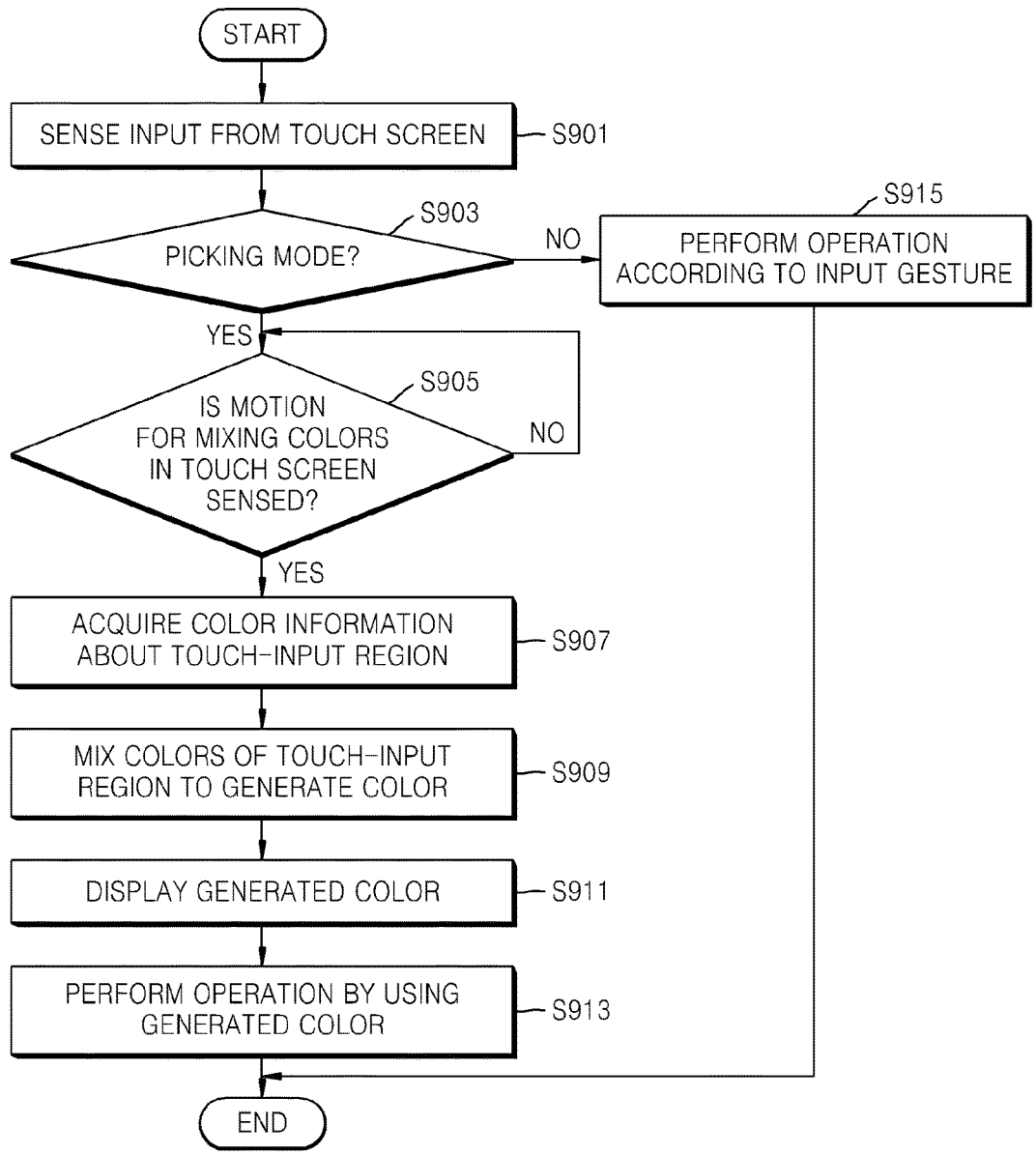
FIG. 9 is a flowchart illustrating a method of generating a color by using a touch screen, according to an exemplary embodiment.

FIG. 9 is a flowchart illustrating a method of generating a color by using a touch screen, according to an exemplary embodiment. According to the method of FIG. 9, when a color generating apparatus 100 senses a motion in which paints are mixed by using a touch screen of an external device as if colors are actually mixed on a palette with a brush, the color generating apparatus 100 may generate a mixed color.

As shown in FIG. 9, the color generating apparatus 100 may sense an input received through a touch screen (S901). The color generating apparatus 100 may sense a touch input by using the sensor included in the color generating apparatus 100 or a sensor included in the touch screen. A display of the external device may not be the touch screen. In this case, the sensor included in the color generating apparatus 100 may sense the touch input, and thus, the color generating apparatus 100 may receive color information from the external device to acquire a color. However, for convenience of description, a case in which the display of the external device is the touch screen will be described below as an example. For example, the color generating apparatus 100 may receive information, indicating that an input is sensed, from the external device including the touch screen to sense a touch screen input. In this case, the color generating apparatus 100 may sense a motion, and thus, at least one mixable color may be displayed on the touch screen.

The color generating apparatus 100 may determine whether the color generating apparatus 100 is in a picking mode (S903). The picking mode may be set according to a user input. When the color generating apparatus 100 is not in the picking mode, an operation of the external device including the touch screen or an operation of the color generating apparatus 100 may be performed according to an input gesture (S915).

When the color generating apparatus 100 is in the picking mode, the color generating apparatus 100 may sense a motion for mixing colors in the touch screen (S905).

The color generating apparatus 100 may acquire color information about a touch-input region in which the motion for mixing the colors in the touch screen is sensed (S907). The color information may include at least one selected from identification information of a color in the touch-input region, region information in which a motion is sensed for each color, and time information in which the motion is sensed. The region information is a closed figure, and may include width information of the touch-input region for each color in the picking mode. The time information may include time information in which a touch input is performed for each color in the picking mode.

The color generating apparatus 100 may generate a mixed color based on the acquired color information (S909). For example, the color generating apparatus 100 may determine a color which is to be mixed and determine a mixing ratio of each color, based on the color information which is acquired in operation S907. The mixing ratio may be determined in proportion to a width of a region, in which a motion is sensed for each color, or a time in which the motion is sensed.

In an exemplary embodiment, when at least one color is displayed on the touch screen and the color generating apparatus 100 includes at least one picked color, the color displayed on the touch screen may be mixed with the picked color of the color generating apparatus 100. Also, even when there is no color displayed on the touch screen, by sensing a motion, at least two picked colors of the color generating apparatus 100 may be mixed with each other according to a mixing condition which is generated in picking.

The color generating apparatus 100 may display the mixed color in a display of the external device or the display included in the color generating apparatus 100 (S911).

The color generating apparatus 100 may perform an operation by using the mixed color (S913).

Figure 10:
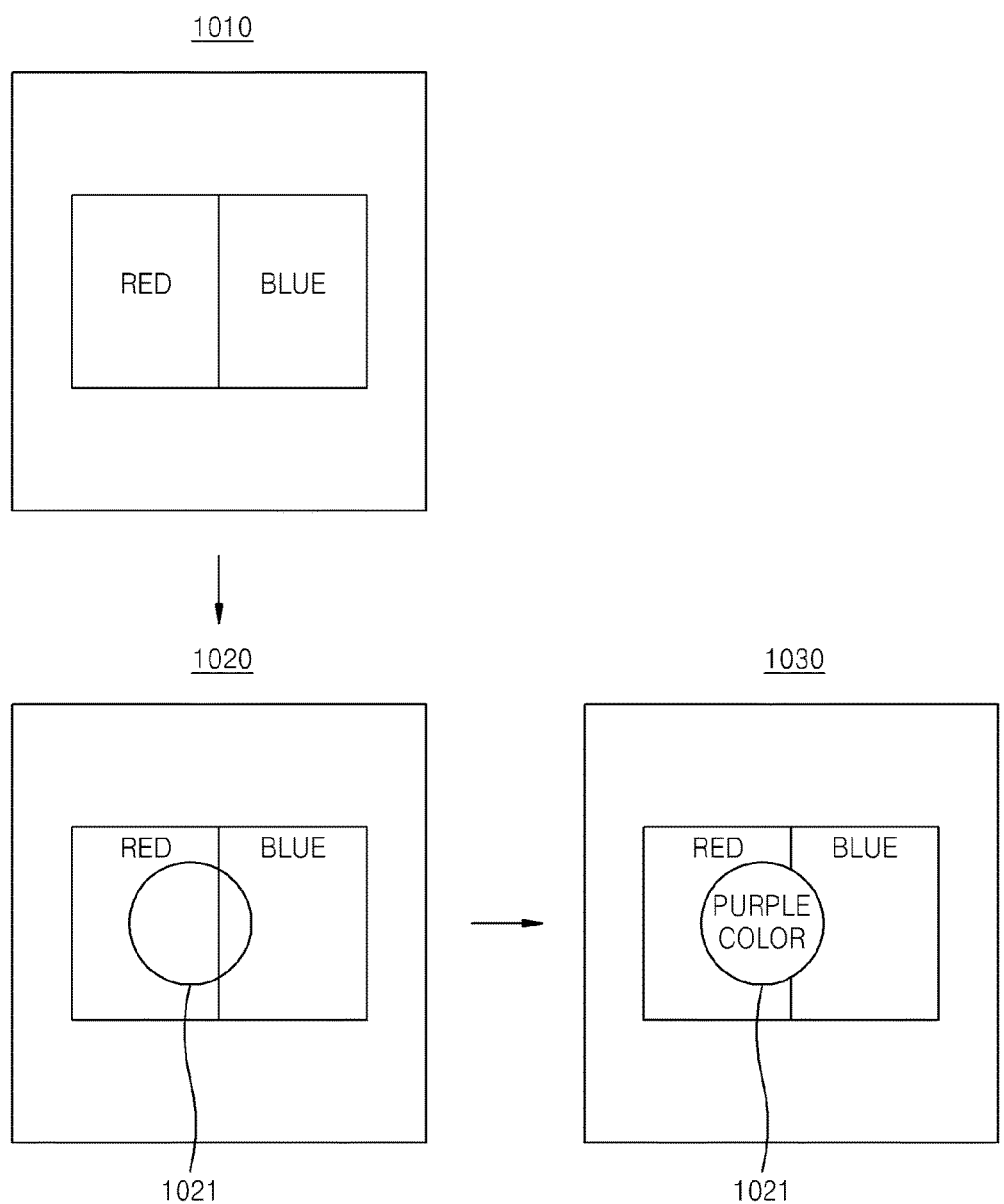
FIG. 10 illustrates an example of displaying a color by using a touch screen in a color generating apparatus according to an exemplary embodiment.

FIG. 10 illustrates an example of displaying a color by using a touch screen in the color generating apparatus according to an exemplary embodiment.

As shown in FIG. 10, colors may be displayed on a touch screen of an external device in each operation of mixing the colors.

A display screen 1010 of the touch screen may display at least two different colors capable of being mixed. The touch screen may receive information of a picked color from the color generating apparatus 100 to display the picked color.

A display screen 1020 of the touch screen may display a region 1021 in which a motion is sensed by the color generating apparatus 100.

A display screen 1030 of the touch screen may display a color generated by mixing the colors in a motion-sensed region. A motion for mixing colors may be performed by the external device including the touch screen, the color generating apparatus 100, or various devices, and thus, a mixed color may be transmitted to and displayed by the touch screen. Since the motion-sensed region includes a proportionally greater red region, a mixing ratio of red may further increase, and thus, the mixed color may be a purple color close to red. Although FIG. 10 illustrates that the display screens 1010, 1020, and 1030 display two different colors in a rectangular shaped region, embodiments are not limited thereto. For example, the display screens 1010, 1020, and 1030 may display three different colors in a circle shaped region divided into three sub-regions with the same angle and arc. In this case, the three different colors are displayed in the three sub-regions, respectively, and a mixing ratio of the three colors may be input by a single continuous touch or gesture going around the center of the circle shaped region.

Figure 11:
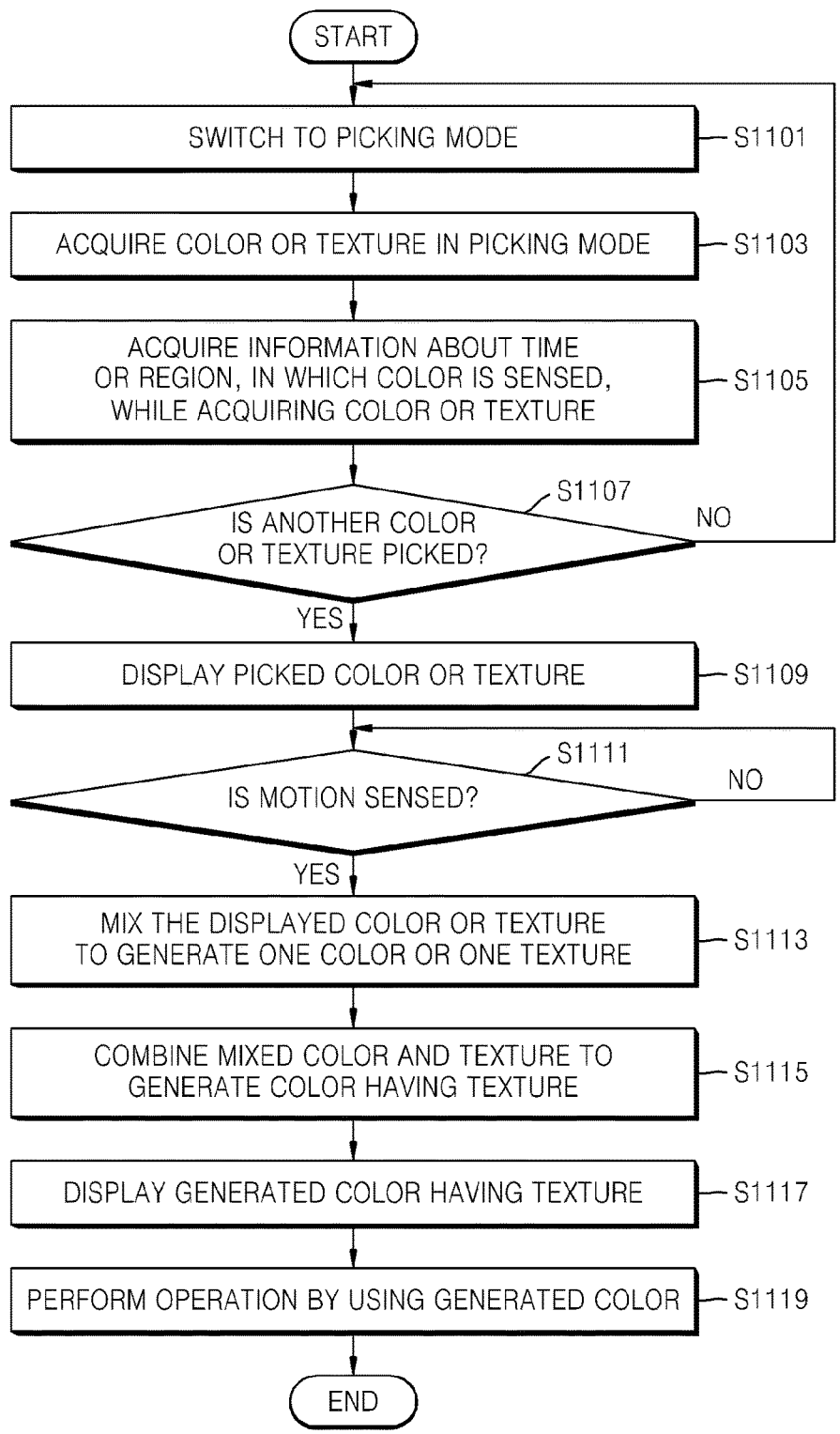
FIG. 11 is a flowchart illustrating a method of generating a color having a texture by using a sensor, according to an exemplary embodiment.

FIG. 11 is a flowchart illustrating a method of generating a color having a texture by using a sensor, according to an exemplary embodiment.

As shown in FIG. 11, a color generating apparatus 100 may switch to a picking mode, for example, according to a user input (S1101).

The color generating apparatus 100 may acquire a color or texture of an external object or environment by using a color sensor or an image sensor while the color generating apparatus 100 is operating in the picking mode (S1103).

While the color generating apparatus 100 is acquiring the color or the texture, the color generating apparatus 100 may further acquire information about a region or a time in which the color or the texture is sensed (S1105).

When two or more colors are mixed with each other, the acquired information may be used to determine a mixing condition. For example, a mixing ratio when a corresponding color is mixed may be determined in proportion to time information or a range of a color-sensed region.

Moreover, when a color having a texture is generated, the acquired information may be used to determine a combining condition. For example, strength when a corresponding texture is combined may be determined in proportion to time information or a range of a texture-sensed region. In this case, as strength increases, a clarity or thickness of a texture combined with a color may increase.

The color generating apparatus 100 may determine whether to pick another color or another texture (S1107). In this case, a picked color or texture may be initialized according to a sensed motion as in operations S709 and S711 of FIG. 7.

The color generating apparatus 100 may display the color or texture which is picked in operations S1101 to S1105.

The color generating apparatus 100 may sense a motion for combining at least one picked color and texture (S1111). The color generating apparatus 100 may sense the motion, based on information received from an external device or information sensed by an inertial sensor of the color generating apparatus 100.

When two or more colors or textures are picked, the color generating apparatus 100 may mix a color and a texture with one of the picked colors or one of the picked textures, for combining a color with a texture according to the sensed motion (S1113).

For example, when there are two or more picked colors, the color generating apparatus 100 may generate one color by mixing two or more colors before combining a color with a texture. In this case, a mixed color may be generated according to the mixing condition determined based on the region or time information which is acquired in operation S1105.

Moreover, when there are two or more picked textures, the color generating apparatus 100 may generate one texture by mixing two or more textures before combining a color with a texture. For example, when the picked textures have a diagonal pattern and wood grain, the color generating apparatus 100 may combine two textures to generate one texture. In this case, a texture may be generated according to the combining condition determined based on the region or time information which is acquired in operation S1105.

The color generating apparatus 100 may combine a color and a texture, mixed with one color or one texture in operation S1113, to generate a new color having a texture (S1115).

The color generating apparatus 100 may display the new color (S1117). In this case, the color generating apparatus 100 may display the new color in the display of the color generating apparatus 100 or a display of the external device.

The color generating apparatus 100 may perform an operation by using the new color which is generated in operation S1115.

Figure 12:
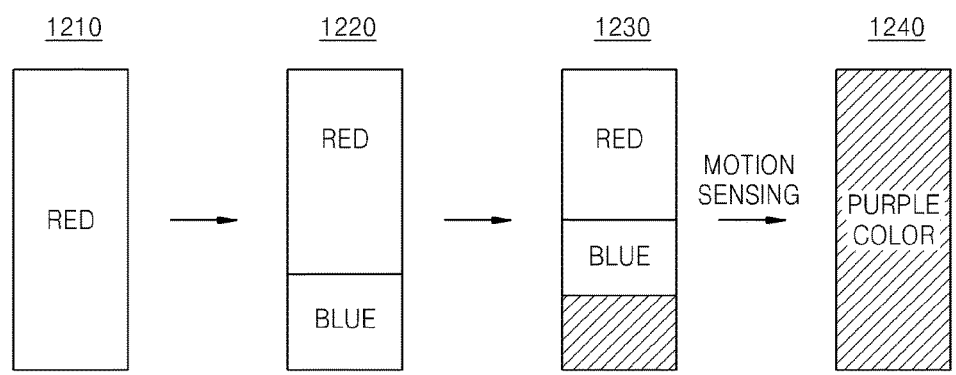
FIG. 12 illustrates an example of displaying a color having a texture in a color generating apparatus according to an exemplary embodiment.

FIG. 12 is an exemplary diagram illustrating an example of displaying a color having a texture in the color generating apparatus according to an exemplary embodiment.

As shown in FIG. 12, the color generating apparatus 100 may display colors in the display in each operation of picking a color and a texture to mix colors. In this case, a color or a texture displayed in the display may be picked by being sensed by a sensor, receiving color or texture information from an external device, or reading color or texture information stored in the memory 160 of the color generating apparatus 100.

A display screen 1210 may represent a state in which red is picked.

A display screen 1220 may represent a state in which red is picked and then blue is picked. In this case, the color generating apparatus 100 may determine a mixing ratio of red and blue, based on a picking time or a width of a picking region, and a ratio at which each color is displayed may differ on the display screen 1220 according to the determined mixing ratio.

A display screen 1230 may display a texture which is picked after red and blue are picked, thereby displaying a state in which the texture is picked.

When a motion which mixes colors to generate a color having a texture is sensed, a display screen 1240 may display a purple color having a texture (i.e., a texture displayed by the display screen 1230) picked by the color generating apparatus 100. In this case, the color generating apparatus 100 may mix two colors, and then combine a mixed color with a texture to generate a color.

Figure 13:
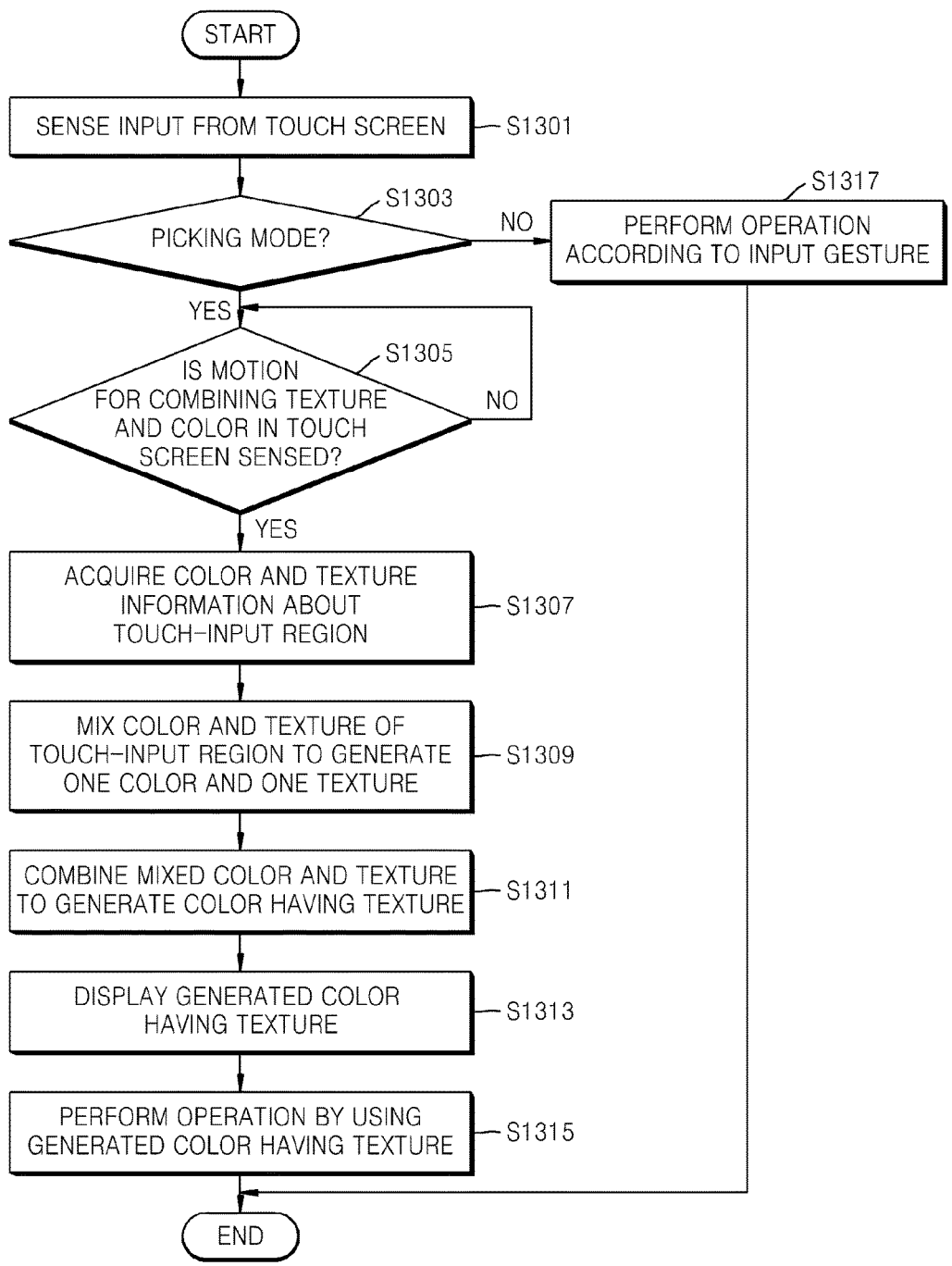
FIG. 13 is an exemplary diagram illustrating an example of generating a color having a texture by using a touch screen in a color generating apparatus according to an exemplary embodiment.

FIG. 13 illustrates an example of generating a color having a texture by using a touch screen in the color generating apparatus according to an exemplary embodiment. According to the method of FIG. 13, when the color generating apparatus 100 senses a motion in which paints are mixed by using a touch screen of an external device as if colors are actually mixed on a palette with a brush, the color generating apparatus 100 may generate a mixed color.

As shown in FIG. 13, a color generating apparatus 100 may sense an input received through a touch screen (S1301). The color generating apparatus 100 may sense a touch input by using a sensor included in the color generating apparatus 100 or a sensor included in the touch screen. A display of the external device may not be the touch screen.

The color generating apparatus 100 may determine whether the color generating apparatus 100 is in a picking mode (S1303). The picking mode may be set according to a user input. When the color generating apparatus 100 is not in the picking mode, an operation of the external device including the touch screen or an operation of the color generating apparatus 100 may be performed according to an input gesture (S1317).

When the color generating apparatus 100 is in the picking mode, the color generating apparatus 100 may sense a motion for generating a color having a texture in the touch screen (S1305).

The color generating apparatus 100 may acquire color or texture information about a touch-input region in which the motion for generating the color having the texture in the touch screen is sensed (S1307). The color or texture information may include at least one selected from identification information of a color or a texture in the touch-input region, region information in which a motion is sensed for each color, and time information in which the motion is sensed.

When two or more colors or textures are picked, the color generating apparatus 100 may mix a color and a texture with one of the picked colors or one of the picked textures, for combining a color with a texture according to the sensed motion (S1309).

For example, when there are two or more picked colors, the color generating apparatus 100 may generate one color by mixing two or more colors before combining a color with a texture. In this case, a mixed color may be generated according to the mixing condition determined based on the region or time information which is acquired in operation S1307.

Moreover, when there are two or more picked textures, the color generating apparatus 100 may generate one texture by mixing two or more textures before combining a color with a texture. For example, when the picked textures have a diagonal pattern and wood grain, the color generating apparatus 100 may combine two textures to generate one texture. In this case, a texture may be generated according to the combining condition determined based on the region or time information which is acquired in operation S1307.

In operation S1311, the color generating apparatus 100 may generate a new color having a texture by using the color and the texture which are acquired in operation S1309, based on the color or texture information which is acquired in operation S1307. Based on the color information which is acquired in operation S1307, the color generating apparatus 100 may determine a combining condition, and generate a new color having a texture according to the determined combining condition.

The color generating apparatus 100 may display the new color in the display of the color generating apparatus 100 or a display of the external device (S1313).

The color generating apparatus 100 may perform an operation by using the new color (S1315).

Figure 14:
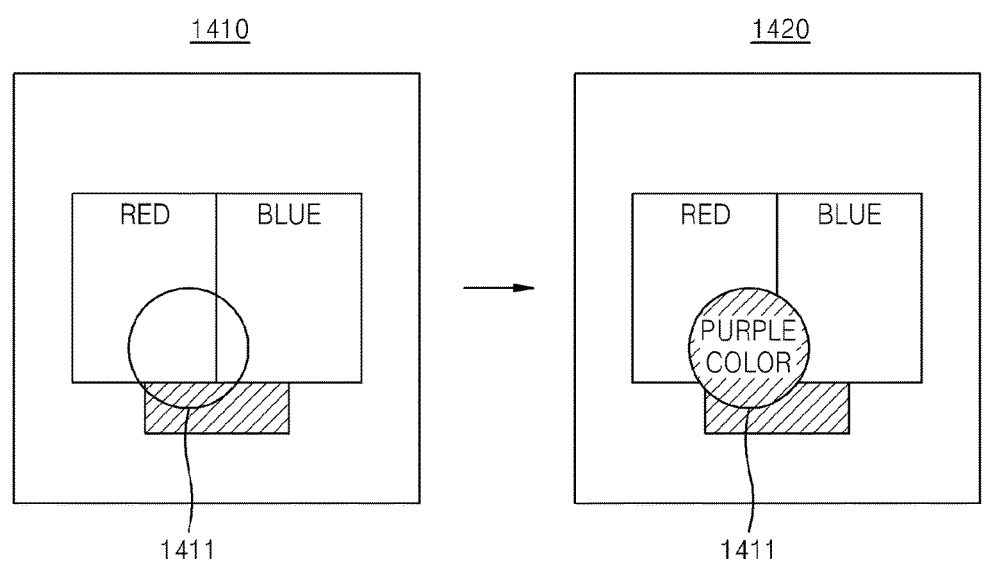
FIGS. 14 and 15 illustrate an example of generating a color having a texture by using a touch screen in a color generating apparatus according to an exemplary embodiment.
Figure 15:
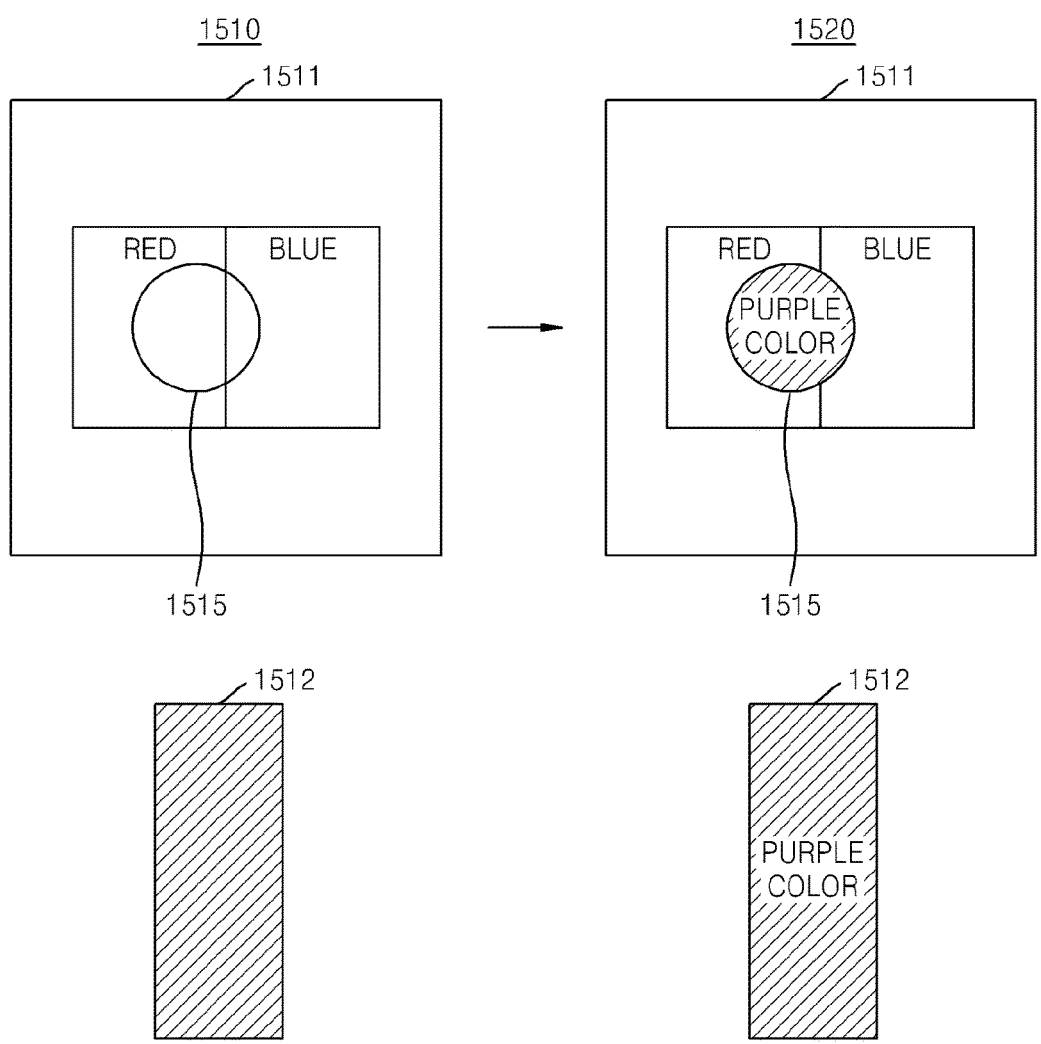

FIGS. 14 and 15 illustrate an example of generating a color having a texture by using a touch screen in the color generating apparatus according to an exemplary embodiment.

As shown in FIG. 14, a touch screen of an external device may display a color and a texture which are used to generate a color having a texture. In this case, the color or the texture displayed on the touch screen of the external device may be acquired by receiving color or texture information from the color generating apparatus 100 or reading color or texture information stored in a memory of the external device.

A display screen 1410 of the touch screen may display the color and the texture which are used to generate the color having the texture. Also, when the color generating apparatus 100 senses a motion in the touch screen, the display screen 1410 may display a region 1411 in which the motion is sensed by the color generating apparatus 100.

A display screen 1420 of the touch screen may display a color which is generated by combining a texture with a mixed color after colors are mixed in a motion-sensed region. A motion which mixes colors and combines a mixed color with a texture may be performed by using the external device including the touch screen, the color generating apparatus 100, or various devices, and the generated color may be displayed by the touch screen. Since the motion-sensed region includes a proportionally greater red region, a mixing ratio of red may further increase, and thus, the generated color may be a purple color close to red. The display screen 1420 may display a purple color combined with a texture in the motion-sensed region 1411. In FIG. 14, although the display screen 1420 displays three rectangular shaped regions placed adjacent to one another, embodiments are not limited thereto. The three regions may be arranged in any manner that allows a user to select each portion of the three regions by a single continuous gesture. For example, the red color, the blue color, and the texture may be displayed in a circle shaped region divided into three sub-regions with the same angle and arc. In this case, one continuous touch or gesture going around the center of the circle shaped area may be used as an input for mixing the colors and the texture.

As shown in FIG. 15, a touch screen 1511 of an external device may display a color which is used to generate a color having a texture, and a display 1512 of the color generating apparatus 100 may display a texture.

In this case, the color displayed on the touch screen 1511 of the external device may be acquired by receiving color information from the color generating apparatus 100 or reading color information stored in a memory of the external device. Also, the texture displayed by the display 1512 of the color generating apparatus 100 may be acquired by receiving texture information from the external device, reading texture information stored in the memory of the color generating apparatus 100, or being sensed by the sensor of the color generating apparatus 100.

A display screen 1510 of the touch screen 1511 may display the color which is used to generate the color having the texture. Also, when the color generating apparatus 100 senses a motion in the touch screen, the display screen 1510 may display a region 1515 in which the motion is sensed by the color generating apparatus 100.

In this case, the display 1512 of the color generating apparatus 100 may display a texture which is combined with the color displayed on the display screen 1510.

A display screen 1520 of the touch screen may display a color which is generated by combining a texture with a mixed color after colors are mixed in a motion-sensed region. A motion which mixes colors and combines a mixed color with a texture may be performed by using the external device including the touch screen, the color generating apparatus 100, or various devices, and the generated color may be displayed by the touch screen. Since the motion-sensed region 1515 includes a proportionally greater red region, a mixing ratio of red may further increase, and thus, the generated color may be a purple color close to red. The display screen 1520 may display a purple color combined with a texture in the motion-sensed region 1515.

According to the above-described embodiment, a case in which one texture is picked by the color generating apparatus 100 and displayed by the display 1512 has been described as an example, but the present embodiment is not limited thereto. As another example, at least one color or texture may be picked by the color generating apparatus 100, and displayed by the display 1512. At least one color or texture displayed in the motion-sensed region 1515 may be mixed with at least one color or texture picked by the color generating apparatus 100 to generate a color. The generated color may be displayed in the motion-sensed region 1515.

Figure 16:
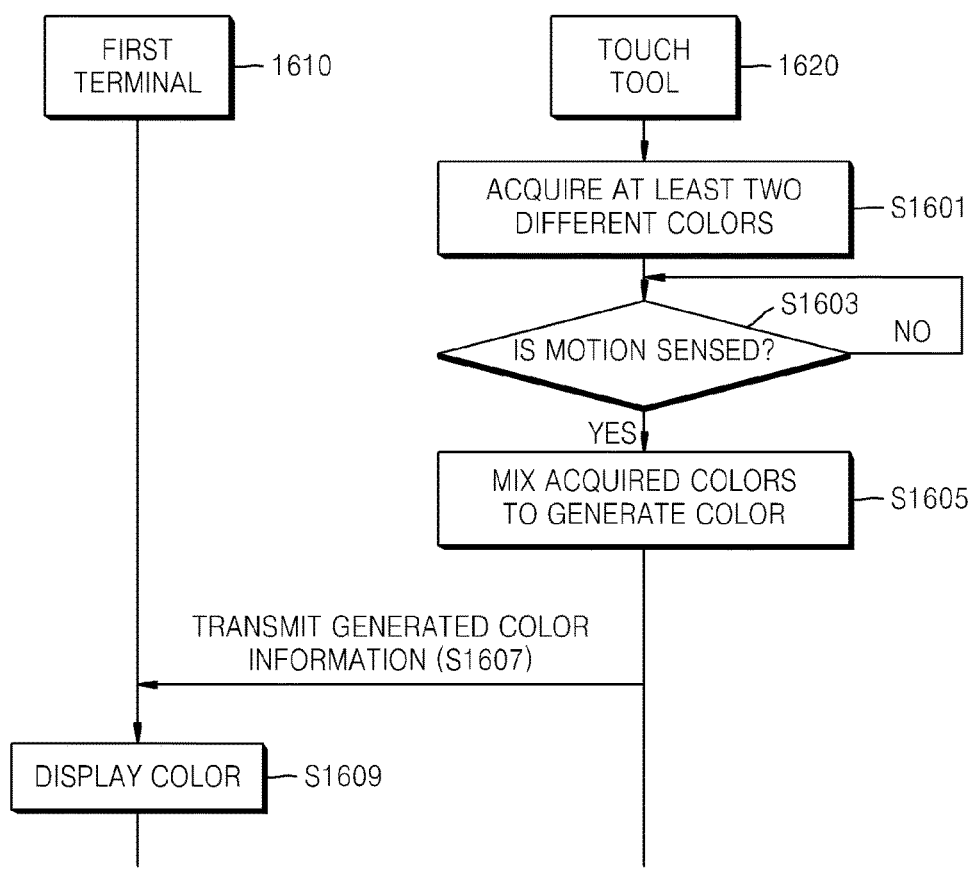
FIG. 16 is a flowchart illustrating a method of generating a color in a color generating system according to an exemplary embodiment.

FIG. 16 is a flowchart illustrating a method of generating a color in the color generating system according to an exemplary embodiment. A first terminal 1610 and a touch tool 1620 of FIG. 16 may respectively correspond to the first terminal 310 and the touch tool 320 of FIG. 3, and thus, a repeated description thereof will be omitted here.

As shown in FIG. 16, the touch tool 1620 may acquire at least two different colors (S1601). In this case, the touch tool 1620 may acquire a color in the above-described method of acquiring a color. Also, when a color having a texture is generated, the touch tool 1620 may acquire at least one color and texture.

The touch tool 1620 may sense a motion for mixing colors (S1603). In this case, the touch tool 1620 may display information, indicating that the motion for mixing the colors is sensed, in a display. For example, the touch tool 1620 may display the colors which are acquired in operation S1601, and display that the colors displayed by the display are mixed according to a sensed motion. Also, when a texture and a color are picked together, the touch tool 1620 may determine the sensed motion as a motion for generating a color having a texture.

The touch tool 1620 may mix the acquired colors to generate a color according to the sensed motion (S1605). Also, when a color having a texture is generated, the touch tool 1620 may combine a color with a texture to generate the color having the texture.

The touch tool 1620 may transmit color information, generated in operation S1605, to the first terminal 1610 (S1607). The first terminal 1610 may display the color which is generated in operation S1605. Alternatively, the first terminal 1610 may perform an operation by using the color information which is generated in operation S1605.

For example, the first terminal 1610 may be used to perform a touch input, and thus, the touch tool 1620 may be used to draw a picture or write letters by using the color which is generated in operation S1605. In this case, the first terminal 1610 may display input information by using the color information generated by the touch tool 1620 according to a touch input of the touch tool 1620.

Figure 17:
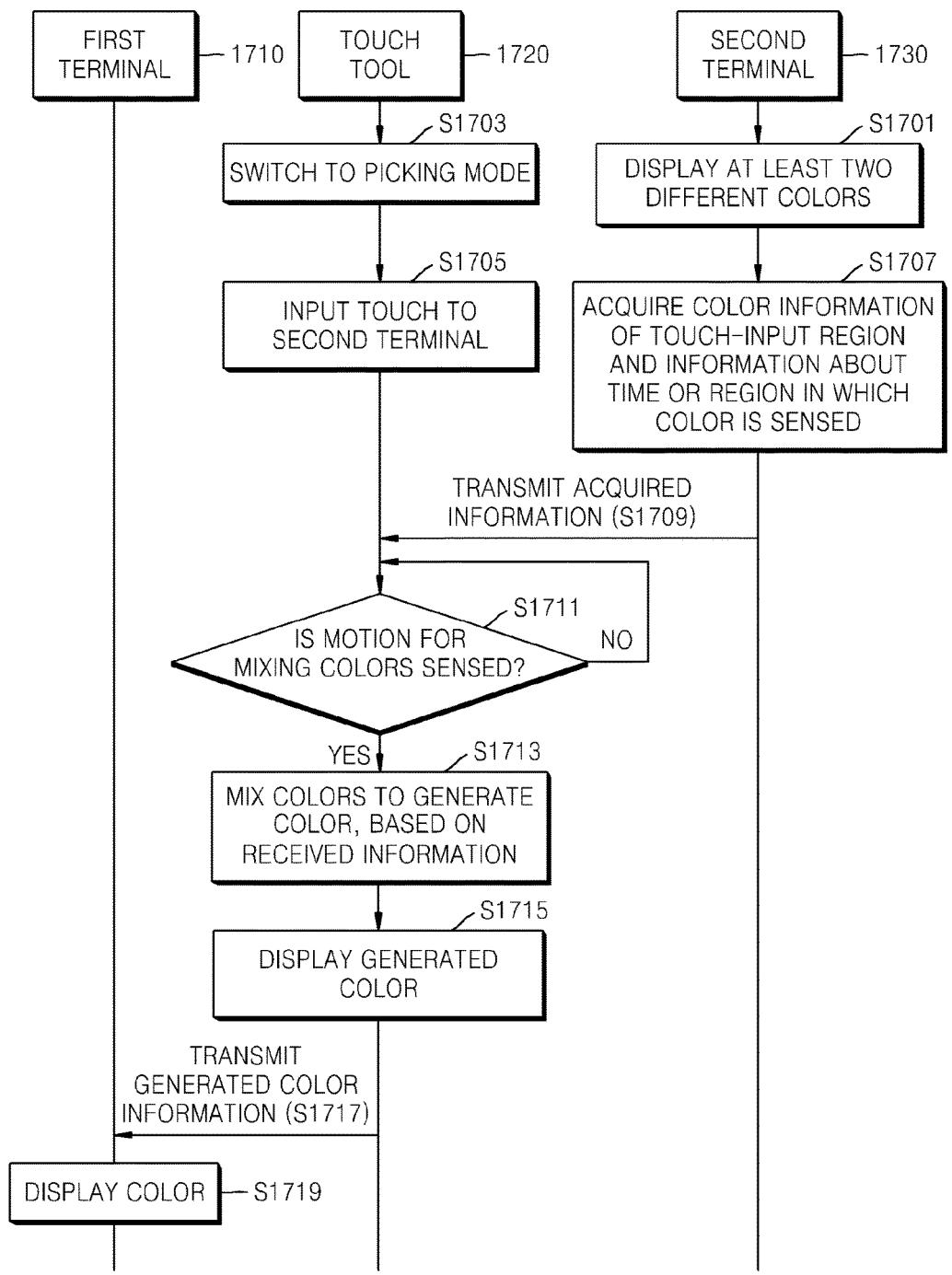
FIG. 17 is a flowchart illustrating a method of generating a color by using a second terminal in a color generating system according to an exemplary embodiment.

FIG. 17 is a flowchart illustrating a method of generating a color by using a second terminal in the color generating system according to an exemplary embodiment.

As shown in FIG. 17, a second terminal 1730 may display at least two or more colors for mixing colors (S1701). Also, the second terminal 1730 may display at least one color and texture so as to generate a color having a texture.

A touch tool 1720 may switch to a picking mode (S1703), and even when the second terminal 1730 is used to perform a touch input, the touch tool 1720 may allow a motion, which mixes colors or generates a color having a texture, to be performed without operating according to a gesture input.

The touch tool 1720 may be used to perform a touch input for mixing colors or generating a color having a texture in the second terminal 1730 (S1705). For example, a touch input equivalent to paints being mixed on a palette with a brush may be performed.

The second terminal 1730 may acquire color information about a touch-input region, information about a color-sensed region, and time information (S1707).

The second terminal 1730 may transmit, to the touch tool 1720, region information or time information about each color of a region in which a touch input is performed by using the touch tool 1720 (S1709), and the touch tool 1720 may determine a mixing condition, based on the transmitted information. In this case, the region information may include information about a range of a touch-input region in a region where each color is displayed, and the time information may include information about a time in which the touch input is continued in the region where each color is displayed.

Moreover, even in a case of generating a color having a texture, similarly to a case of mixing colors, time information or region information about each color or texture which is input through a touch may be transmitted to the touch tool 1720. The touch tool 1720 may determine a mixing condition or a combining condition, based on the transmitted information.

The touch tool 1720 may sense a motion for mixing colors or generating a color having a texture (S1711).

The touch tool 1720 may mix the colors or generate the color having the texture, based on the information which is received from the second terminal 1730 (S1713).

The touch tool 1720 may display the generated color (S1715). Operation S1715 may not be performed depending on the case.

The touch tool 1720 may transmit the generated color information to the first terminal 1710 (S1717), and the first terminal 1710 may display the color information (S1719). Alternatively, the first terminal 1710 may perform an operation by using the generated color information.

As described above, according to the one or more of the above embodiments of the present invention, a color which is to be generated is easily and quickly generated through a simple operation.

Moreover, according to the one or more of the above embodiments of the present invention, a color having a texture is easily and quickly generated through a simple operation.

The method according to an exemplary embodiment may be implemented as a program or code readable stored in a non-transitory computer-readable recording medium and executed by a processor or computer. The computer-readable recording medium includes all kinds of storage devices that store data readable by a computer system. Examples of computer-readable recording devices include ROM, RAM, CD-ROM, magnetic tapes, floppy disks, and optical data storage devices.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of generating a color by a color generating apparatus, the method comprising:
   displaying at least two different colors and a texture on a touch screen;
   acquiring information corresponding to the at least two different colors and the texture displayed on the touch screen;
   sensing a motion for mixing colors;

generating information corresponding to a mixed color of the at least two different colors and the texture based on the sensed motion using a predetermined algorithm; and displaying the mixed color having the texture on the touch screen, wherein the acquiring the information comprises obtaining information about a range of a region on the touch screen in which a user input on the at least two different colors and the texture is sensed, wherein the range of the region includes a portion of each of the at least two different colors displayed on the touch screen and a portion of the texture displayed on the touch screen, wherein the user input on the at least two different colors and the texture is a continuous touch on the at least two different colors and the texture displayed on the touch screen to include the portion of each of the at least two different colors and the portion of the texture displayed on the touch screen, wherein the region on the touch screen is a closed area formed by the continuous touch, wherein the mixed color having the texture is displayed in the closed area formed by the continuous touch, and wherein the mixed color having the texture displayed on the touch screen is determined based on a size of the portion of the texture in the range of the region and a ratio of portions of the at least two different colors in the range of the region.

2. The method of claim 1, wherein the acquiring comprises sensing the at least two different colors by a color sensor and acquiring the information based on the sensed at least two colors.

3. The method of claim 1, wherein the acquiring comprises:
sensing an input for at least one color displayed on the touch screen; and
receiving color information, from an external device of the touch screen, corresponding to the at least one color displayed on the touch screen.

4. The method of claim 1, wherein the sensing comprises sensing, by a motion sensor, a motion which shakes the color generating apparatus.

5. The method of claim 1, wherein the sensing comprises:
receiving information about a motion of the color generating apparatus from an external device; and
sensing the motion of the color generating apparatus, based on the received information.

6. The method of claim 1, wherein the generating information corresponding to the mixed color and the texture comprises:
determining a mixing condition of the at least two different colors based on the ratio of the portions of the at least two different colors in the range of the region; and
obtaining information corresponding to the mixed color of the at least two different colors based on the mixing condition.

7. The method of claim 6, wherein the determining of the mixing condition comprises acquiring a time or a region in which each of the at least two different colors is sensed, and
the obtaining the information corresponding to the mixed color of the at least two different colors comprises determining the mixing condition, based on the acquired time or the acquired region.

8. The method of claim 1, further comprising:
acquiring at least two different textures;
combining the acquired at least two different textures to generate a mixed texture; and
generating information corresponding to the mixed color having the mixed texture based on the sensed motion.

9. The method of claim 1,
wherein strength of the texture is in proportion to the size of the portion of the texture in the range of the region.

10. A non-transitory computer-readable storage medium storing a program that is executable by a computer to perform the method of claim 1.

11. A color generating system comprising:
a touch tool including a touch screen and configured to display at least two different colors and a texture on the touch screen, acquire information corresponding to the at least two different colors and the texture displayed on the touch screen, sense a motion for mixing colors, and generate information corresponding to a mixed color of the at least two different colors and the texture based on the sensed motion using a predetermined algorithm; and
a first terminal configured to receive the information corresponding to the mixed color and the texture from the touch tool and display the mixed color having the texture based on the received information,
wherein the touch tool is further configured to obtain information about a range of a region on the touch screen in which a user input on the at least two different colors and the texture is sensed,
wherein the range of the region includes a portion of each of the at least two different colors displayed on the touch screen and a portion of the texture displayed on the touch screen,
wherein the user input on the at least two different colors and the texture is a continuous touch on the at least two different colors and the texture displayed on the touch screen to include the portion of each of the at least two different colors and the portion of the texture displayed on the touch screen,
wherein the region on the touch screen is a closed area formed by the continuous touch,
wherein the mixed color having the texture is displayed in the closed area formed by the continuous touch, and
wherein the mixed color having the texture is determined based on a size of the portion of the texture in the range of the region and a ratio of portions of the at least two different colors in the range of the region.

12. The color generating system of claim 11, wherein the touch tool is further configured to acquire information about a time in which a touch input on the touch screen is sensed.

13. The color generating system of claim 11, further comprising a second terminal configured to display the mixed color having the texture.

14. The color generating system of claim 11, wherein,
in response to the motion of the touch tool being sensed, the first terminal transmits information about the motion of the touch tool to the touch tool.

15. A color generating apparatus comprising:
a display configured to display a plurality of colors and a texture;
a sensor configured to sense a touch or a gesture with respect to the color generating apparatus; and
a controller configured to select at least two different colors from the plurality of colors and determine a mixing condition for the selected at least two different colors based on the sensed touch or the sensed gesture, and generate information corresponding to a mixed color of the at least two different colors and the texture based on the mixing condition and the texture using a predetermined algorithm, wherein the controller is further configured to obtain information about a range of a region on the display in which the touch or the gesture on the at least two different colors and the texture is sensed, and control the display to display the mixed color having the texture, wherein the range of the region includes a portion of each of the at least two different colors displayed on the display and a portion of the texture displayed on the display, wherein the touch or the gesture on the at least two different colors and the texture is a continuous touch or gesture on the at least two different colors and the texture displayed on the display to include the portion of each of the at least two different colors and the portion of the texture displayed on the display, wherein the region on the display is a closed area formed by the continuous touch or gesture, wherein the mixed color having the texture is displayed in the closed area formed by the continuous touch or gesture, and wherein the mixed color having is determined based on a size of the portion of the texture in the range of the region and a ratio of portions of the at least two different colors in the range of the region.

16. The color generating apparatus of claim 15, wherein the plurality of colors are displayed in a region divided into sub-regions by a number of the plurality of colors, and the plurality of colors are arranged in a manner allowing the touch or the gesture to be input by a single continuous touch or a single continuous gesture.

17. The color generating apparatus of claim 15, wherein the displayed plurality of colors are acquired from an image sensor that captures a color of an external object or an external environment.

18. The color generating apparatus of claim 15, wherein the controller is configured to determine the mixing condition based on a time duration and a size of the region in which the touch or the gesture is sensed.

19. The color generating apparatus of claim 15, wherein the sensor is configured to sense a touch or a gesture for mixing the texture and the at least two different colors, and the controller is configured to determine a mixing condition based on the sensed touch or gesture.

* * * * *